United States Patent
Kwack et al.

(10) Patent No.: US 12,531,314 B2
(45) Date of Patent: *Jan. 20, 2026

(54) SEPARATOR FOR SECONDARY BATTERY AND ELECTROCHEMICAL DEVICE USING THE SAME

(71) Applicants: SK Innovation Co., Ltd., Seoul (KR); SK IE TECHNOLOGY CO., LTD., Seoul (KR)

(72) Inventors: Won Sub Kwack, Daejeon (KR); Min Sang Park, Daejeon (KR); Yun Bong Kim, Daejeon (KR); Dong Yeon Lee, Daejeon (KR); Kyu Young Cho, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 16/660,443

(22) Filed: Oct. 22, 2019

(65) Prior Publication Data

US 2020/0127261 A1  Apr. 23, 2020

(30) Foreign Application Priority Data

Oct. 23, 2018  (KR) .................. 10-2018-0126729

(51) Int. Cl.
| | |
|---|---|
| H01M 50/46 | (2021.01) |
| H01M 10/0525 | (2010.01) |
| H01M 50/403 | (2021.01) |
| H01M 50/409 | (2021.01) |
| H01M 50/417 | (2021.01) |
| H01M 50/443 | (2021.01) |
| H01M 50/446 | (2021.01) |
| H01M 50/451 | (2021.01) |
| H01M 50/489 | (2021.01) |

(52) U.S. Cl.
CPC ..... *H01M 50/461* (2021.01); *H01M 10/0525* (2013.01); *H01M 50/403* (2021.01); *H01M 50/409* (2021.01); *H01M 50/417* (2021.01); *H01M 50/443* (2021.01); *H01M 50/446* (2021.01); *H01M 50/451* (2021.01); *H01M 50/489* (2021.01)

(58) Field of Classification Search
CPC ...... H01M 2/168; H01M 2/145; H01M 2/166; H01M 2/18; H01M 2/1686; H01M 50/461; H01M 50/446; H01M 50/449; H01M 50/411; H01M 50/409; H01M 50/403; H01M 50/463; H01M 50/417; H01M 50/414; H01M 50/42; H01M 50/489; H01M 50/443

See application file for complete search history.

(56) References Cited

U.S. PATENT DOCUMENTS

| | | | | |
|---|---|---|---|---|
| 5,462,586 A | * | 10/1995 | Sugiyama | ............... B32B 5/024 96/13 |
| 11,322,800 B2 | * | 5/2022 | Kwack | ................ H01M 50/403 |
| 2005/0069769 A1 | * | 3/2005 | Nakayama | .............. H01M 4/13 252/182.1 |
| 2005/0266150 A1 | * | 12/2005 | Yong | ........................ H01M 4/13 427/58 |
| 2006/0008700 A1 | * | 1/2006 | Yong | ................... H01M 50/417 429/251 |
| 2009/0111025 A1 | * | 4/2009 | Lee | ..................... H01M 50/489 429/251 |
| 2010/0015530 A1 | * | 1/2010 | Katayama | ................ H01G 9/02 429/251 |
| 2010/0248026 A1 | * | 9/2010 | Hinoki | .................. H01M 50/46 429/209 |
| 2011/0311856 A1 | * | 12/2011 | Matsui | ................ H01M 50/451 429/144 |
| 2013/0224555 A1 | * | 8/2013 | Hong | .................. H01M 50/443 429/144 |
| 2014/0030608 A1 | * | 1/2014 | l'Abee et al. | ........ H01M 50/411 429/326 |
| 2015/0050544 A1 | * | 2/2015 | Nam | .................... H01M 50/414 429/144 |

(Continued)

FOREIGN PATENT DOCUMENTS

| | | |
|---|---|---|
| CN | 104769753 A | 7/2015 |
| JP | 4414165 | 2/2010 |

(Continued)

OTHER PUBLICATIONS

"Synthesis of poly(ethylene-co-acrylic acid) via a tandem hydrocarboxylation/hydrogenation of poly(butadiene)", Wiggins et al., Polymer Chemistry Journal, issue 7 pp. 2239-2245, <https://doi.org/10.1039/C2PY20855E> (Year: 2013).*

Motta, "The Effect of Copolymerization on Transition Temperatures of Polymeric Materials", Journal of Thermal Analysis, vol. 49 (1997) 461-464 (Year: 1997).*

Mai et al., "Thermal Properties and Flame Retardance of Al(OH)3/Polypropylene Composites Modified by Polypropylene Grafting with Acrylic Acid", Journal of Applied Polymer Science 81, pp. 2679-2686, Wiley and Sons (Year: 2001).*

Omnexus, "Glass Transition Temperature (Tg) of Plastics—Definition & Values", The material selection platform: Plastics & Elastomers, <https://omnexus.specialchem.com/polymer-properties/properties/glass-transition-temperature> (Year: 2015).*

(Continued)

*Primary Examiner* — Jessie Walls-Murray
(74) *Attorney, Agent, or Firm* — IP&T GROUP LLP

(57) ABSTRACT

Provided are a separator for an aqueous secondary battery and an electrochemical device using the same. More specifically, provided is a composite separator having a more excellent cycle life and including a coating layer which is not easily swollen in an electrolyte solution. In the composite separator for a secondary battery according to an aspect of the present invention, distortion or lifting phenomenon is suppressed even when the heat and pressure are applied without significant decrease in permeability of the separator.

7 Claims, No Drawings

(56) References Cited

U.S. PATENT DOCUMENTS

| | | | | |
|---|---|---|---|---|
| 2015/0236323 A1* | 8/2015 | Honda | ............... | H01M 50/449 |
| | | | | 429/144 |
| 2015/0303427 A1* | 10/2015 | Hyun | ............... | H01M 50/434 |
| | | | | 429/144 |
| 2015/0311490 A1* | 10/2015 | Murase | ............ | H01M 10/0525 |
| | | | | 429/131 |
| 2015/0372277 A1* | 12/2015 | Honda | ............... | H01M 50/40 |
| | | | | 429/145 |
| 2016/0141575 A1* | 5/2016 | Sasaki | ............... | H01M 50/46 |
| | | | | 429/246 |
| 2016/0218340 A1* | 7/2016 | Ryu | ............... | H01M 10/0525 |
| 2017/0331094 A1† | 11/2017 | Lee | | |
| 2017/0338459 A1* | 11/2017 | Nakahiro | ............... | C09J 133/06 |
| 2018/0311930 A1* | 11/2018 | Sakamoto | ............... | B32B 7/12 |
| 2020/0220174 A1* | 7/2020 | Isshiki | ............... | C08K 5/30 |
| 2020/0235373 A1* | 7/2020 | Tanaka | ............... | H01M 50/414 |

FOREIGN PATENT DOCUMENTS

| | | | | | |
|---|---|---|---|---|---|
| KR | 10-2015-0089000 | A | | 8/2015 | |
| KR | 20160036988 | A | † | 4/2016 | |
| KR | 20160041496 | A | * | 4/2016 | ......... H01M 10/052 |
| KR | 1020160036988 | A | | 4/2016 | |
| KR | 1020160041496 | A | | 4/2016 | |
| KR | 20160065692 | A | † | 6/2016 | |
| KR | 1020160065692 | A | | 6/2016 | |
| KR | 20160109669 | A | * | 9/2016 | |
| KR | 10-2016-0118979 | A | | 10/2016 | |

OTHER PUBLICATIONS

Chemical Book, "Poly(acrylic acid) CAS#: 9003-01-4", <https://www.chemicalbook.com/ProductChemicalPropertiesCB8708560_EN.htm> (Year: 2011).*
De Bruyne ("The Adhesive Properties of Epoxy Resins", J. Appl. Chem., pp. 303-310, Jul. 6, 1956 <https://onlinelibrary.wiley.com/doi/pdf/10.1002/jctb.5010060708> (Year: 1956).*
Protolabs ("Glass Transition Temperature of Polymers", <https://www.protolabs.com/resources/design-tips/glass-transition-temperature-of-polymers/>, accessed May 21, 2024) (Year: 2024).*
Saffar et al.; "Development of polypropylene microporous hydrophilic membranes by blending with PP-g-MA and PP-g-AA", Journal of Membrane Science 462 (2014) 50-61, https://doi.org/10.1016/j.memsci.2014.03.024 (Year: 2014).*
Fasce et al.; "Poly(acrylic acid) surface grafted polypropylene films: Near surface and bulk mechanical response", eXPRESS Polymer Letters vol. 2, No. 11 (2008) 779-790; DOI: 10.3144/expresspolymlett.2008.91 (Year: 2008).*
Mandal et al.; "Optimization of acrylic acid grafting onto polypropylene using response surface methodology and its biodegradability", Radiation Physics and Chemistry 132 (2017) 71-81, http://dx.doi.org/10.1016/j.radphyschem.2016.12.003 (Year: 2017).*
Extended Search Report issued by European Patent Office on Feb. 28, 2020.
Office Action for the Chinese Patent Application No. 201911014091.3 issued by the Chinese Patent Office on Nov. 2, 2022.
Office Action for the Korean Patent Application No. 10-2018-0126729 issued by the Korean Patent Office on Oct. 5, 2023.

\* cited by examiner
† cited by third party

SEPARATOR FOR SECONDARY BATTERY AND ELECTROCHEMICAL DEVICE USING THE SAME

CROSS-REFERENCE TO RELATED APPLICATIONS

This application claims priority under 35 U.S.C. § 119 to Korean Patent Application No. 10-2018-0126729, filed on Oct. 23, 2018, in the Korean Intellectual Property Office, the disclosure of which is incorporated herein by reference in its entirety.

TECHNICAL FIELD

The following disclosure relates to a separator for an aqueous secondary battery and an electrochemical device using the same.

More particularly, the following disclosure relates to a composite separator having a more excellent cycle life and including a coating layer which does not easily swell in an electrolyte solution.

BACKGROUND

Recently, a secondary battery having high capacity and a large size, which is applied to an electric automobile, or the like, has been developed. As a part of the development, an electrode-separator assembly technique in which an electrode and a separator are stacked and integrated has been used.

However, this type of electrode-separator assembly may cause lifting phenomenon or a distortion in the preparation or during the use, resulting in a decrease in efficiency, such as failing to achieve a desired high capacity. Also, it is difficult to enlarge the size due to the occurrence of distortion, or the like.

Furthermore, a gap may be formed between an electrode and a separator according to charge and discharge, which is a factor that deteriorates a cycle life. Therefore, it is an important technique to maintain uniformly adhesiveness of an adhesive part in an electrode or a separator.

To solve the above problems, there is a technique used by coating acryl-based resins or modified fluorine-based resins on a surface in contact with an electrode, but these resins are easily swollen or decomposed in an electrolyte solution, resulting in an adverse effect on a battery cycle life.

RELATED ART DOCUMENT

Patent Document (Patent Document 1) Japanese Patent Publication No. 4414165 (2009 Nov. 27)

SUMMARY

The present invention is intended to solve the above problems, and forms a specialized polyolefin-based latex on the surface of a separator in contact with an electrode surface as an electrode adhesive layer, thereby solving the above problems.

An embodiment of the present invention is directed to providing a composite separator without lifting phenomenon of the electrode surface and the separator surface when heat and pressure are applied in the process of integrating the electrode and the separator.

Another embodiment of the present invention is directed to providing a composite separator capable of maintaining a battery cycle life for a long time without easy swelling or decomposing in the electrolyte solution.

Another embodiment of the present invention is directed to providing a composite separator including a coating layer in which slip properties are improved to improve assemblability between the electrode surface and the separator when a composite separator is manufactured, the composite separator is easily seated on an electrode surface due to slip properties or the like upon assembly, such that no wrinkles occur, and also no distortion or lifting phenomenon occurs between the electrode and the separator.

Another embodiment of the present invention is directed to providing a composite separator that allows the manufacture of a battery having excellent cycle characteristics and capable of achieving a desired high capacity by the above-described advantages.

Another embodiment of the present invention is directed to providing a composite separator including an electrode adhesive layer having an excellent heat resistance.

In one general aspect, there is provided a composite separator including a porous substrate, and a heat-resistant electrode adhesive layer formed on the porous substrate, wherein the heat-resistant electrode adhesive layer includes polyolefin-based organic particles and inorganic particles, and a Gurley permeability satisfies the following Equation 1, and a change amount in a Gurley permeability satisfies the following Equation 2:

$$G_1 \leq 300 \quad \text{[Equation 1]}$$

$$G_2 - G_1 \leq 100 \quad \text{[Equation 2]}$$

wherein $G_2$ is a Gurley permeability measured according to ASTM D726 in a state where the composite separator is stacked between two TEFLON® (PTFE, polytetrafluoroethylene, Registered trademark of Dupont Inc.) sheets, the composite separator and the TEFLON® sheets are pressed and fused at 4 MPa and 70° C., and the TEFLON® sheets are then removed, and $G_1$ is a Gurley permeability of the composite separator before fusion, where a unit of the Gurley permeability is sec/100 CC.

Other features and aspects will be apparent from the following detailed description and the claims.

DETAILED DESCRIPTION OF EMBODIMENTS

Hereinafter, the present invention will be described in more detail with reference to Examples and Comparative Examples. The following Examples are only a reference for describing the present invention in detail, and the present invention is not limited thereto and may be implemented in various forms.

In addition, all technical terms and scientific terms have the same meanings as those commonly understood by a person skilled in the art to which the present invention pertains unless otherwise defined. The terms used herein are only for effectively describing certain embodiments, and not intended to limit the present invention.

In addition, singular forms used in the specification and the appended claims are intended to include the plural forms as well unless otherwise indicated in context.

An aspect of the present invention provides a composite separator including a porous substrate, and a heat-resistant electrode adhesive layer formed on the porous substrate, wherein the heat-resistant electrode adhesive layer includes polyolefin-based organic particles and inorganic particles, and a Gurley permeability satisfies the following Equation 1, and a change amount in a Gurley permeability satisfies the following Equation 2:

$$G_1 \leq 300 \qquad \text{[Equation 1]}$$

$$G_2 - G_1 \leq 100 \qquad \text{[Equation 2]}$$

wherein $G_2$ is a Gurley permeability measured according to ASTM D726 in a state where the composite separator is stacked between two TEFLON® (PTFE, Registered trademark of Dupont Inc.) sheets, the composite separator and the TEFLON® sheets are pressed and fused at 4 MPa and 70° C., and the TEFLON® sheets are then removed, and $G_1$ is a Gurley permeability of the composite separator before fusion, where a unit of the Gurley permeability is sec/100 cc.

The heat-resistant electrode adhesive layer may include 0.8 to 5 g/m² of polyolefin-based organic particles and 0.8 to 10 g/m² of inorganic particles.

The heat-resistant electrode adhesive layer may include inorganic particles: polyolefin-based organic particles in a weight ratio of 50 to 90:10 to 50.

The polyolefin-based organic particles may have an average particle size of 0.2 to 0.7 μm.

The polyolefin-based organic particles may be spherical particles.

The polyolefin-based organic particles may have a melting temperature of 80° C. or more and a glass transition temperature of −30 to 10° C.

The polyolefin-based organic particles may have a weight change rate of less than 50% according to the following Equation 3 upon immersion in an electrolyte solution:

$$\text{Weight change rate} = (W2-W1)/W1 \times 100 \qquad \text{[Equation 3]}$$

wherein W2 is a weight measured after immersion in the electrolyte solution for 3 days, and W1 is a weight measured before immersion in the electrolyte solution.

The inorganic particles may have an average particle size of 1 μm or less.

The inorganic particles may be any one or a mixture of two or more selected from boehmite, calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, inorganic particles having a dielectric constant of 5 or more, inorganic particles having piezoelectricity, and inorganic particles having a lithium ion transfer capacity, or the like.

The heat-resistant electrode adhesive layer is formed by applying an aqueous slurry containing inorganic particles, polyolefin-based organic particles, and water, and may have a solid content of the particles in the aqueous slurry of 1 to 30 wt %.

The content of the particles in the aqueous slurry may include inorganic particles: polyolefin-based organic particles in a weight ratio of 50 to 90:10 to 50.

The heat-resistant electrode adhesive layer may have a thickness of 1 to 5 μm.

The composite separator may have a peel strength of 10 to 100 gf/25 mm, when the composite separator is stacked on a carbon sheet having a thickness of 200 μm so that the electrode adhesive layer faces the carbon sheet, the composite separator and the carbon sheet are pressed and fused at 4 MPa and 70° C. for 1 second, and then subjected to a 180 degree peel test.

Another aspect of the present invention is an electrochemical device comprising the composite separator.

In an aspect of the present invention, the electrochemical device may be a lithium secondary battery.

Hereinafter, each configuration of the present invention will be described in more detail.

[Porous Substrate]

In an aspect of the present invention, the porous substrate is not limited as long as it is usually used as a separator of a secondary battery.

For example, the porous substrate may be a woven fabric, a non-woven fabric, and a porous film. The porous substrate may also be a multilayer stacked with one or more of those mentioned above. The material of the porous substrate is not limited, but specifically, may be, for example, formed of any one or a mixture of two or more selected from the group consisting of polyethylene, polypropylene, polybutylene, polypentene, polymethylpentene, polyethylene terephthalate, polybutylene terephthalate, polyacetal, polyamide, polycarbonate, polyimide, polyether sulfone, polyphenylene oxide, polyphenylene sulfide, polyethylene naphthalene, and a copolymer thereof.

A thickness of the porous substrate is not limited, and may be usually 1 to 100 μm, which is a range used in the art, specifically 5 to 50 μm, and more preferably 6 to 30 μm, but is not limited thereto.

[Heat-Resistant Electrode Adhesive Layer]

In an aspect of the present invention, the heat-resistant electrode adhesive layer provides heat resistance and slip properties when manufacturing the electrode assembly, and does not cause distortion or lifting phenomenon even when the heat and pressure are applied, thereby improving the stability of the battery.

In an aspect of the present invention, the heat-resistant electrode adhesive layer may include polyolefin-based organic particles and inorganic particles.

As the inorganic particles, specifically, boehmite, calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, or the like may be, for example, used. In addition, as inorganic particles having a dielectric constant of 5 or more, any one or a mixture of two or more selected from $SrTiO_3$, $SnO_2$, $CeO_2$, MgO, NiO, CaO, ZnO, $ZrO_2$, $Y_2O_3$, $Al_2O_3$, $TiO_2$, or SiC may be used. Further, as inorganic particles having piezoelectricity, any one or a mixture of two or more selected from $BaTiO_3$, $Pb(Zr,Ti)O_3$ (PZT), $Pb_{1-x}La_xZr_{1-y}TiyO_3$ (PLZT), $PB(Mg_3Nb_{2/3})O_3$—$PbTiO_3$ (PMN-PT), or hafnia ($HfO_2$) may be used. Further, as inorganic particles having a lithium ion transfer capacity, any one or a mixture of two or more selected from the following may be used: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ series glass ($0<x<4$, $0<y<13$), lithium Lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) series glass, or $P_2S_5$ ($Li_xP_yS_z$, $0<x<3$, $0<y<3$, $0<z<7$) series glass. When inorganic particles having a high dielectric constant, inorganic particles having piezoelectricity, and inorganic particles having a lithium ion transfer capacity are mixed, their synergistic effect may be doubled.

The size of the inorganic particles is not limited, but an average particle size may be 1 μm or less, specifically 0.001 to 1 μm, more specifically 0.01 to 0.9 μm, and the most specifically 0.1 to 0.5 μm. In the above ranges, an appropriate porosity may be provided, which is preferable.

The content of the inorganic particles is not limited, but may be 50 to 90 wt %, and more specifically 60 to 80 wt %, based on 100 wt % of the total particle content used in the heat-resistant electrode adhesive layer. The above ranges are enough to achieve the desired heat resistance.

The inorganic particles may be included in the heat-resistant electrode adhesive layer in an amount of 0.8 to 10 g/m², and more specifically 2 to 8 g/m². When the content of the inorganic particles is in the above ranges, the change in the Gurley permeability after fusion may be minimized.

The polyolefin-based organic particles are preferably polyolefin-based organic particles having a melting temperature ($T_m$) of 80° C. or more, specifically 80 to 180° C., and more specifically 95 to 155° C., and a glass transition temperature ($T_g$) of 10° C. or less and specifically −30 to 10° C. In addition, a temperature at which the polyolefin-based organic particles begin to melt and form a film, i.e., a film formation temperature, may be 20 to 90° C., specifically 30 to 70° C., and more specifically 50 to 65° C. When the electrode assembly is manufactured in the above ranges, distortion or lifting phenomenon between the electrode and the separator may be prevented from occurring so that the battery capacity may be maximized. In addition, adhesion is performed within a range that does not significantly impair the permeability of the porous substrate, thereby making it possible to maintain the inherent permeability of the separator at the maximum even after the composite separator is fused on the electrode to integrate with the electrode.

More specifically, a Gurley permeability of the composite separator may satisfy the following Equation 1, and the change amount in a Gurley permeability of the composite separator may satisfy the following Equation 2:

$$G_1 \leq 300 \quad \text{[Equation 1]}$$

$$G_2 - G_1 \leq 100 \quad \text{[Equation 2]}$$

wherein $G_2$ is a Gurley permeability measured according to ASTM D726 in a state where the composite separator is stacked between two TEFLON® (PTFE, Registered trademark of Dupont Inc.) sheets, the composite separator and the TEFLON® sheets are pressed and fused at 4 MPa and 70° C., and the TEFLON® sheets are then removed, and G1 is a Gurley permeability of the composite separator before fusion, where a unit of the Gurley permeability is sec/100 cc.

These properties, in an aspect of the present invention, seem to be due to the thermal properties of the polyolefin-based organic particles used as organic particles.

In Equations 1 and 2, $G_1$ may be 300 sec/100 cc or less, specifically 100 to 300 sec/100 cc, more specifically 150 to 250 sec/100 cc, and most specifically 170 to 220 sec/100 cc. In the above ranges, the electrochemical stability of the battery is excellent, which is preferable.

In addition, $G_2-G_1$ may be 100 sec/100 cc or less, specifically 10 to 100 sec/100 cc, more specifically 20 to 99 sec/100 cc, and most specifically 30 to 95 sec/100 cc. In the above ranges, the electrochemical stability of the battery is excellent, which is preferable.

In addition, a Gurley permeability change rate (ΔP) may be 10 to 60%, specifically 15 to 55%, and more specifically 20 to 30%. In the above ranges, the electrochemical stability of the battery is excellent, which is preferable. ΔP=($G_2-G_1$)/$G_1$×100, $G_2$ is a Gurley permeability measured according to ASTM D726 in a state where the composite separator is stacked between two TEFLON® (PTFE, Registered trademark of Dupont Inc.) sheets, the composite separator and the TEFLON® sheets are pressed and fused at 4 MPa and 70° C., and the TEFLON® sheets are then removed, and G1 is a Gurley permeability of the composite separator before fusion, where a unit of the Gurley permeability is sec/100 CC.

In an aspect of the present invention, the polyolefin-based organic particles may be polyolefin-based copolymers obtained by reacting polyolefin-based homopolymers or polyolefin-based monomers with comonomers, and more specifically comonomers such as acrylic acid, methacrylic acid, succinic acid and anhydrides thereof. More specifically, the content of the comonomer may be 0.01 to 5 mol %, and more specifically 0.5 to 3 mol % of the copolymer.

The polyolefin-based homopolymer may be polyethylene and polypropylene, and more preferably, polypropylene. In addition, as the polyolefin-based homopolymer, the copolymer of polyethylene and polypropylene is also possible.

In addition, the polyolefin-based organic particles may be a polyolefin-based latex, which is dispersed in water to maintain a spherical shape.

In an aspect of the present invention, the polyolefin-based organic particles may have a melting temperature ($T_m$) of 80° C. or more, specifically 80 to 180° C., and more specifically 95 to 155° C., and a glass transition temperature of −30 to 10° C. and more specifically −30 to 0° C. In the above ranges, it is possible to provide a composite separator having desired anti-blocking properties and a low weight change rate with respect to the electrolyte solution.

The polyolefin-based organic particles may satisfy the physical properties having a weight change rate of less than 50%, specifically 1 to 49%, and more specifically 10 to 45% according to the following Equation 3 upon immersion in an electrolyte solution. Accordingly, the composite separator including the heat-resistant electrode adhesive layer according to an aspect of the present invention may be prevented from swelling or decomposing by the electrolyte solution when the electrolyte solution is injected after manufacture of the electrode assembly.

Accordingly, when applying the composite separator according to an aspect of the present invention, the phenomenon of swelling or decomposition by the electrolyte solution may be significantly reduced, thereby further improving the cycle characteristics of the battery.

When the weight change rate was 50% or more, it was shown that the initial life was very low when the battery life characteristics were measured.

The weight change rate was measured as follows. A polyolefin-based latex containing the polyolefin-based organic particles used in the heat-resistant electrode adhesive layer of the present invention was placed on a TEFLON® petridish, and then water was evaporated at 60° C. for 1 day to prepare a film. Then, after being left for 3 days in a state in which 1 g of the film is immersed in the electrolyte solution, the electrolyte solution was decanted, and the film weight was measured to calculate the weight change rate.

$$\text{Weight change rate}=(W2-W1)/W1 \times 100 \quad \text{[Equation 3]}$$

wherein W2 is a weight measured after immersion in the electrolyte solution for 3 days, and W1 is a weight measured before immersion in the electrolyte solution.

Here, the electrolyte solution may be used without limitation as long as it is usually used in the art. For example, any one or a mixed solvent of two or more selected from organic solvents such as carbonate-based solvents, nitrile-based solvents, ester-based solvents, ether-based solvents, ketone-based solvents, glyme-based solvents, alcohol-based solvents, and aprotic solvents; and water may be used. In addition, the electrolyte solution may further include a lithium salt in addition to the above solvents.

As the carbonate-based solvent, any one or a mixture of two or more selected from the group consisting of ethylene carbonate, propylene carbonate, butylene carbonate, ethyl methyl carbonate, ethyl propyl carbonate, methyl propyl carbonate, dimethyl carbonate, diethyl carbonate, and dipropyl carbonate may be used, but is not limited thereto.

As the nitrile-based solvents, any one or a mixture of two or more selected from acetonitrile, succinonitrile, adiponitrile, and sebaconitrile may be used, but is not limited thereto.

As the ester-based solvents, any one or a mixture of two or more selected from methyl acetate, ethyl acetate, n-propyl acetate, 1,1-dimethylethyl acetate, methyl propionate, ethyl propionate, γ-butyrolactone, decanolide, valerolactone, mevalonolactone, and caprolactone may be used, but is not limited thereto.

As the ether-based solvents, any one or a mixture of two or more selected from dimethyl ether, dibutyl ether, tetraglyme, diglyme, dimethoxyethane, 2-methyltetrahydrofuran, and tetrahydrofuran may be used, but is not limited thereto.

As the ketone-based solvents, cyclohexanone, or the like may be used.

As the glyme-based solvents, any one or a mixture of two or more selected from ethylene glycol dimethyl ether, triethylene glycol dimethyl ether, and tetraethylene glycol dimethyl ether may be used, but is not limited thereto.

As the alcohol-based solvents, ethyl alcohol, isopropyl alcohol, or the like may be used. As the aprotic solvents, nitriles such as R—CN (where R is a linear, branched or cyclic $C_2$-$C_{20}$ hydrocarbon group; and may include double bond aromatic rings or ether bonds); amides such as dimethylformamide; dioxolanes such as 1,3-dioxolane; sulfolanes, or the like may be used.

The lithium salt may be any one or a mixture of two or more selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalato borate ($LiB(C_2O_4)_2$), lithium trifluoromethanesulfonylimide ($LiN(C_xF_{2x+1}SO_2)(C_yF_{2y+1}SO_2)$) (where x and y are natural numbers), and derivatives thereof. The concentration of the lithium salt may be 0.1 to 10.0 M, and more specifically 1 to 5 M, but is not limited thereto.

More specifically, the electrolyte solution, for example, may be obtained by mixing ethylene carbonate:ethyl methyl carbonate:dimethyl carbonate in a volume ratio of 3:5:2.

The polyolefin-based organic particles may be included in the heat-resistant electrode adhesive layer in an amount of 0.8 to 5 g/m$^2$, and more specifically 1 to 3 g/m$^2$. When the content of the organic particles is in the above ranges, the change in the Gurley permeability after fusion may be minimized, which is desirable.

The polyolefin-based organic particles may have an average particle size of 0.2 to 0.7 μm, and may be present as spherical particles in a state of being dispersed in water. In the above ranges, slip properties are excellent, and the increase in the Gurley permeability after fusion may be minimized.

The polyolefin-based organic particles may be included in an amount of 10 to 50 wt %, and more specifically 20 to 30 wt %, based on 100 wt % of the total particle content used in the heat-resistant electrode adhesive layer. The above ranges are enough to express slip properties and fusion properties.

In an aspect of the present invention, the electrode adhesive layer is formed by applying an aqueous slurry containing inorganic particles, polyolefin-based organic particles, and water, and may have a solid content of the particles in the aqueous slurry of 1 to 30 wt %. That is, particles, in which inorganic particles: polyolefin-based organic particles are mixed in a weight ratio of 50 to 90:10 to 50, may be included in an amount of 10 to 50 wt % in the aqueous slurry.

In an aspect of the present invention, the heat-resistant electrode adhesive layer may be formed on the porous substrate. Specifically, the heat-resistant electrode adhesive layer may be, for example, formed on one surface or both surfaces of the porous substrate. The heat-resistant electrode adhesive layer may also be formed by stacking of two or more layers.

In an aspect of the present invention, the heat-resistant electrode adhesive layer may have a thickness of 1 to 5 μm, specifically 2 to 4 μm, and more specifically 2 to 3 μm. Although the thickness is not limited to the above range, in the above ranges, it may be appropriate to achieve the desired Gurley permeability and the Gurley permeability change rate after fusion.

In an aspect of the present invention, the composite separator may have a peel strength of 10 to 150 gf/25 mm, specifically 20 to 130 gf/25 mm, and more specifically 30 to 110 gf/25 mm when the composite separator is stacked on a carbon sheet having a thickness of 200 μm so that the electrode adhesive layer faces the carbon sheet, the composite separator and the carbon sheet are pressed and fused at 4 MPa and 70° C. for 1 second, and then subjected to a 180 degree peel test. When the electrode assembly is manufactured in the above ranges, the occurrence of distortion or lifting phenomenon may be suppressed. Therefore, also the battery capacity may be maximized, and a battery having excellent cycle characteristics may be provided.

[Manufacturing Method]

In an aspect of the present invention, a method of forming the heat-resistant electrode adhesive layer may allow a coating layer to be formed by applying an aqueous slurry for the heat-resistant electrode adhesive layer on a porous substrate. The coating method is not limited, and specifically, may be, for example, conventional coating methods such as bar coating, dip coating, and spray coating.

In addition, in the process of drying after coating, drying is preferably performed at a temperature up to the temperature at which the polyolefin-based organic particles used in the heat-resistant electrode adhesive layer are filmed. Drying may be specifically performed at 45° C. or less, and more preferably 40° C. or less.

Hereinafter, the present invention will be described in more detail on the basis of Examples and Comparative Examples. However, the following Examples and Comparative Examples are an example for describing the present invention in more detail, and the present invention is not limited by the following Examples and Comparative Examples.

Hereinafter, the physical properties were measured as follows.

1. Gurley Permeability

A Gurley permeability was measured as a gas permeability. The Gurley permeability was measured according to ASTM D726 standard using a densometer manufactured by Toyoseiki. The time taken for 100 cc of air to pass through the area of 1 square inch of the separator was recorded in seconds, and the values were compared.

2. ΔP (Gurley Permeability after Fusion)

Gurley permeability after fusion was measured according to ASTM D726 standard using a densometer manufactured by Toyoseiki, after stacking the composite separator between two TEFLON® sheets, followed by pressing and fusing the composite separator and the TEFLON® sheets at 4 MPa and 70° C. for 1 second using a heat press machine.

$\Delta P = (G_2 - G_1)/G_1 \times 100$, $G_2$ is a Gurley permeability measured according to ASTM D726 in a state where the composite separator and the TEFLON® sheets are fused, and the TEFLON® sheets are then removed, and $G_1$ is a Gurley permeability of the composite separator before fusion.

3. Peel Strength (Fusing Force)

A carbon sheet having a thickness of 200 μm (manufactured by TOYO TANSO KOREA CO., LTD., product name: PF-20HP) was used instead of an electrode.

Peel strength was measured after stacking so that the electrode adhesive layer of the composite separator faces on the carbon sheet, and then pressing and fusing the composite separator and the carbon sheets at 4 MPa and 70° C. for 1 second using a heat press machine. The peel strength was measured by a 180° C. peel test method using a tensile measuring apparatus (3343) manufactured by INSTRON.

4. Anti-Blocking Properties

The composite separator coated on both surfaces was wound by 1000 m on a roll, and left to stand at room temperature for 3 days to determine whether the adhesive was achieved by fusion between the innermost composite separators of a core.

OK is a case where blocking between film surfaces does not occur, and NG is a case where blocking between film surfaces occurs.

5. Weight Change Rate Upon Immersion in Electrolyte Solution (Swelling Properties)

An aqueous slurry containing the polyolefin-based organic particles for forming the electrode adhesive layer was placed on a TEFLON® Petridish, and water was evaporated at 60° C. for 1 day to prepare a film. Then, the film was left for 3 days in a state in which 1 g of the film is immersed in the electrolyte solution obtained by mixing ethylene carbonate:ethyl methyl carbonate:dimethyl carbonate in a volume ratio of 3:5:2, the electrolyte solution was decanted, and then the film weight was measured to calculate the weight change rate.

$$\text{Weight change rate} = (W2 - W1)/W1 \times 100$$

wherein W2 is a weight of the film measured after immersion in the electrolyte solution for 3 days, and W1 is a weight of the film measured before immersion in the electrolyte solution.

6. Degree of Crystallinity

An aqueous slurry containing the polyolefin-based organic particles for forming the electrode adhesive layer was placed on a TEFLON® Petridish, water was evaporated at 60° C. for 1 day to prepare a film, and then the degree of crystallinity was determined by X-ray diffraction.

7. Battery Resistance

1) Preparation of Cathode 94 wt % of $LiCoO_2$ as a cathode active material, 2.5 wt % of polyvinylidene fluoride as a fusing agent, and 3.5 wt % of carbon black as a conductive agent were added to N-methyl pyrrolidone as a solvent so that the solid content was 50 wt % and stirring was performed to prepare a uniform cathode slurry. The cathode slurry was coated on an aluminum foil having a thickness of 30 μm, which was dried and pressed to prepare a cathode plate having a thickness of 150 μm.

2) Manufacture of Anode 95 wt % of artificial graphite as an anode active material, 3 wt % of an acryl-based latex having a $T_g$ of −52° C. as a fusion agent, and 2 wt % of carboxymethyl cellulose as a thickener were added to water as a solvent so that the solid content was 48 wt % and stirring was performed to prepare a uniform anode slurry. The anode slurry was coated on a copper foil having a thickness of 20 μm, which was dried and pressed to prepare an anode plate having a thickness of 150 μm.

A pouch-type battery was assembled in a stacking manner using the composite separator prepared in Examples and Comparative Examples between the cathode and the anode as prepared above. Then, in order to fuse the cathode, the anode, and the separator together, the battery was placed in a heat press machine, heat-fused by applying heat and pressure at 70° C. and 4 MPa, and then the electrolyte solution in which 1 M lithium hexafluoro phosphate ($LiPF_6$) was dissolved and ethylene carbonate:ethyl methyl carbonate:dimethyl carbonate were mixed in a volume ratio of 3:5:2, was injected to manufacture a lithium secondary battery having a capacity of 65 mAh.

In the following table, BEST means that the resistance is lower than the reference sample having electrical resistance of 750 mΩ, BETTER means that the resistance is equivalent to that of the reference sample, HIGH means that the resistance is 20% to 50% higher than the reference sample, and BAD means that the resistance is 50% or more higher than the reference sample.

8. Battery Life Characteristics

Each of batteries manufactured through the assembly process was charged and discharged 100 times at a discharge rate of 1C, and then a cycle evaluation was performed to measure the degree of reduction relative to the initial capacity by measuring the discharge capacity.

A sharp drop in initial life means that the capacity retention rate drops by 20% or more within 50 cycles.

Example 1

<Preparation of Slurry for Heat-Resistant Electrode Adhesive Layer>

80 wt % of alumina particles having an average particle size of 0.7 μm, and 20 wt % of polyolefin-based latex (solid content 35 wt %), in which the polyolefin-based particles having an average particle size of 0.5 μm, a $T_m$ of 95° C. and a glass transition temperature of −20° C. (polypropylene copolymer copolymerized with 1.5 mol % acrylic acid) were dispersed in water to maintain a spherical shape, were diluted in water so that the solid content was 40 wt % to prepare a slurry for electrode adhesive layer.

<Preparation of Composite Separator>

The slurry for the heat-resistant electrode adhesive layer was coated on one surface of a polyethylene-based porous substrate having a Gurley permeability of 150 sec/100 cc and a thickness of 9 μm (SK Innovation Co., Ltd., ENPASS) using a slot coating die. After coating at a speed of 10 m/min, it was dried through a 40° C. hot air dryer having a length of 6 m and wound up in roll shape. The heat-resistant electrode adhesive layer had a thickness of 3 μm. The content of polyolefin-based particles in the electrode adhesive layer was 2 g/m² and the content of the inorganic particles was 8 g/m².

The physical properties of prepared composite separator were measured and are shown in Table 1 below.

Examples 2 and 3

As shown in Table 1 below, a composite separator was prepared in the same manner as in Example 1, except that the type of the polyolefin-based latex was changed.

The physical properties of prepared composite separator were measured and are shown in Table 1 below.

Comparative Examples 1 and 2

As shown in Table 1 below, a composite separator was prepared in the same manner as in Example 1, except that the type of the polyolefin-based latex was changed.

The physical properties of prepared composite separator were measured and are shown in Table 1 below.

Comparative Example 3

As shown in Table 1 below, a composite separator was prepared in the same manner as in Example 1, except that the acryl-based binder (styrene acrylic copolymer, solid content 20 wt %) was used.

The physical properties of prepared composite separator were measured and are shown in Table 2 below.

TABLE 1

| | | Example 1 | Example 2 | Example 3 |
|---|---|---|---|---|
| Physical properties of binder used in electrode adhesive layer | Particle size (μm) | 0.5 | 0.7 | 0.2 |
| | $T_m$ (° C.) | 95 | 97 | 155 |
| | $T_g$ (° C.) | −20 | −20 | 0 |
| | Particle type | Polyolefin-based latex | Polyolefin-based latex | Polyolefin-based latex |
| Physical properties of electrode adhesive layer | Thickness (μm) | 3 | 3 | 3 |
| | Weight change rate upon immersion in electrolyte solution (%) | 43 | 36 | 31 |
| Physical properties of composite separator | Gurley permeability (sec/100 cc) | 204 | 192 | 172 |
| | Gurley permeability after fusion (sec/100 cc) | 281 | 246 | 267 |
| | ΔP (%) | 37.75 | 28.13 | 55.23 |
| | Peel strength (gf/25 mm) | 38 | 42 | 56.3 |
| | Whether antiblocking occurs | OK | OK | OK |
| | Degree of crystallinity | Yes | Yes | Yes |
| | Battery resistance | BETTER (717 mΩ) | BETTER (714 mΩ) | BEST (706 mΩ) |
| | Battery life characteristics | 100 cycle life retention rate: 93% | 100 cycle life retention rate: 95% | 100 cycle life retention rate: 94% |

TABLE 2

| | | Comp. Example 1 | Comp. Example 2 | Comp. Example 3 |
|---|---|---|---|---|
| Physical properties of binder used in electrode adhesive layer | Particle size (μm) | 0.05 | 0.1 | 0.5 |
| | $T_m$ (° C.) | 93 | 95 | — |
| | $T_g$ (° C.) | 0 | −30 | 40 |
| | Particle type | Polyolefin-based latex | Polyolefin-based latex | Acryl-based latex |
| Physical properties electrode adhesive layer | Thickness (μm) | 3 | 3 | 0.5 |
| | Weight change rate upon immersion in electrolyte solution (%) | 28 | 120 | 542 |
| Physical properties of composite separator | Gurley permeability (sec/100 cc) | 2010 | 234 | 220 |
| | Gurley permeability after fusion (sec/100 cc) | 3510 | 468 | 600 |
| | ΔP (%) | 74.63 | 100 | 172.73 |
| | Peel strength (gf/25 mm) | 7.3 | 27 | 109 |
| | Whether antiblocking occurs | OK | NG | NG |
| | Degree of crystallinity | Yes | Yes | No |
| | Battery resistance | BAD (830 mΩ) | HIGH (760 mΩ) | BAD (900 mΩ) |
| | Battery life characteristics | Sharp drop in initial life | 50 cycle life retention rate: 80% | Sharp drop in initial life |

As shown in Table 1, it was found that the composite separator of the present invention had a small change in Gurley permeability after fusion, a small weight change upon immersion in the electrolyte solution, and excellent battery life characteristics.

In the composite separator for a secondary battery according to an aspect of the present invention, distortion or lifting phenomenon is suppressed even when the heat and pressure are applied without significant decrease in permeability of the separator. Therefore, cycle characteristics are excellent and a desired capacity may be achieved.

It is possible also to provide a composite separator, which is not easily swollen or decomposed in the electrolyte solution and thus has a more excellent cycle characteristics, and which is excellent in slip properties and thus has anti-blocking properties.

In addition, according to an aspect of the present invention, during the integration process of the electrode and the separator, no lifting phenomenon on the electrode surface and the separator surface occurs; when the electrode and the separator are integrated, the slip properties are improved, such that assemblability between the electrode surface and the separator is improved; the composite separator is easily seated on an electrode surface due to slip properties, or the like upon assembly, such that no wrinkles occur; and no distortion or lifting phenomenon between the electrode and the separator occurs.

In addition, according to an aspect of the present invention, it is possible to provide a composite separator that allows the manufacture of a battery having excellent cycle characteristics and capable of achieving a desired high capacity.

Further, a composite separator according to an aspect of the present invention may provide a composite separator capable of improving a blocking phenomenon between coating layers upon winding a prepared product.

Furthermore, the composite separator according to an aspect of the present invention may provide a composite separator having an excellent heat resistance.

Hereinabove, although the present invention has been described by specific matters, the limited embodiments and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A composite separator comprising:
    a porous substrate, and a heat-resistant electrode adhesive layer formed on the porous substrate,
    wherein the heat-resistant electrode adhesive layer includes a binder and inorganic particles, wherein the binder includes organic particles formed from a polypropylene copolymer with comonomers of any one or a mixture of two or more selected from the group consisting of acrylic acid, methacrylic acid, succinic acid, and anhydrides thereof, and have a melting temperature of 80 to 180° C., a glass transition temperature of −30 to 10° C., and an average particle size of 0.2 to 0.7 μm,
    wherein the organic particles have a weight change rate of 10 to 45% according to the following Equation 3 upon immersion in an electrolyte solution, and
    a Gurley permeability satisfies the following Equation 1, and a change amount in a Gurley permeability satisfies the following Equation 2:

$G_1 \leq 300$ [Equation 1]

$G_2 - G_1 \leq 100$ [Equation 2]

wherein $G_2$ is a Gurley permeability measured according to ASTM D726 in a state where the composite separator is stacked between two PTFE (polytetrafluoroethylene) sheets, the composite separator and the PTFE sheets are pressed and fused at 4 MPa and 70° C., and the PTFE sheets are then removed, and $G_1$ is a Gurley permeability of the composite separator before fusion, where a unit of the Gurley permeability is sec/100 cc, weight change rate=$(W2-W1)/W1 \times 100$, [Equation 3]

wherein W2 is a weight measured after immersion in the electrolyte solution for 3 days, and W1 is a weight measured before immersion in the electrolyte solution,
wherein the heat-resistant electrode adhesive layer includes inorganic particles: organic particles in a weight ratio of 50 to 90:10 to 50.

2. The composite separator of claim 1, wherein the organic particles are spherical particles of polypropylene copolymer with acrylic acid and have the melting temperature of 95° C., and the glass transition temperature of −20° C.

3. The composite separator of claim 1, wherein the inorganic particles have an average particle size of 1 μm or less.

4. The composite separator of claim 1, wherein the heat-resistant electrode adhesive layer has a thickness of 1 to 5 μm.

5. The composite separator of claim 1, wherein the composite separator has a peel strength of 10 to 100 gf/25 mm when the composite separator is stacked on a carbon sheet having a thickness of 200 μm so that the heat-resistant electrode adhesive layer faces the carbon sheet, the composite separator and the carbon sheet are pressed and fused at 4 MPa and 70° C. for 1 second, and then subjected to a 180 degree peel test.

6. An electrochemical device comprising the composite separator of claim 1.

7. The composite separator of claim 1, wherein the heat-resistant electrode adhesive layer includes 0.8 to 5 g/m² of organic particles and 0.8 to 10 g/m² of inorganic particles.

* * * * *